United States Patent
Splettstoesser et al.

[11] Patent Number: 6,116,857
[45] Date of Patent: Sep. 12, 2000

[54] BLADE WITH REDUCED SOUND SIGNATURE, FOR AIRCRAFT ROTATING AEROFOIL, AND ROTATING AEROFOIL COMPRISING SUCH A BLADE

[75] Inventors: Wolf R. Splettstoesser; Berend Van De Wall, both of Braunschweig, Germany; Yves Delrieux, Saint-Denis, France; Patrick Gardarein, Ville d'Avray, France

[73] Assignee: Onera, France

[21] Appl. No.: 09/143,474

[22] Filed: Aug. 28, 1998

[30]    Foreign Application Priority Data

Sep. 10, 1997  [FR]  France ................................ 97 11230

[51] Int. Cl.⁷ ........................................... B63H 1/26
[52] U.S. Cl. ................................... 416/228; 416/238
[58] Field of Search ............................ 416/223 R, 228, 416/237, 238, DIG. 2, DIG. 5

[56]                References Cited

U.S. PATENT DOCUMENTS

| | | |
|---|---|---|
| 2,475,337 | 7/1949 | Platt . |
| 3,065,933 | 11/1962 | Williams . |
| 3,066,742 | 12/1962 | Castles, Jr. .............................. 416/228 |
| 3,467,197 | 9/1969 | Spivey et al. ........................... 416/228 |
| 4,142,837 | 3/1979 | De Simone ........................ 416/223 R |
| 5,332,362 | 7/1994 | Toulmay et al. ....................... 416/238 |
| 5,584,661 | 12/1996 | Brooks . |

FOREIGN PATENT DOCUMENTS

| | | |
|---|---|---|
| 0244895 | 1/1981 | U.S.S.R. ............................ 416/223 R |
| 264 965 | of 0000 | United Kingdom . |
| 2 001 023 | 1/1979 | United Kingdom . |

*Primary Examiner*—Edward K. Look
*Assistant Examiner*—James M. McAleenan
*Attorney, Agent, or Firm*—Piper Marbury Rudnick & Wolfe

[57]               ABSTRACT

A blade is disclosed for an aircraft rotating aerofoil. The aerodynamically profiled main part of the blade includes an external end part adjacent to the tip of the blade and extending along the span over a distance of at least 0.2 R, where R is the radius of the rotor. The end part having a rear camber over a distance along the span of at least 0.15 R, and the aerodynamically profiled main part includes also a front cambered part, immediately adjacent to the inside of the rear cambered end part.

15 Claims, 1 Drawing Sheet

BLADE WITH REDUCED SOUND SIGNATURE, FOR AIRCRAFT ROTATING AEROFOIL, AND ROTATING AEROFOIL COMPRISING SUCH A BLADE

FIELD OF INVENTION

The invention concerns a blade with a reduced sound signature, for an aircraft rotating aerofoil, such as a helicopter main rotor.

The invention relates more precisely to a blade the geometry of which is optimised in order to reduce the noise emitted by a helicopter main rotor or convertible rotor equipped with such blades, in particular during certain flight phases of the helicopter or of the convertible, particularly in descent and in landing approach, phases of flight during which a significant noise source comes from the interaction of the rotor blades with the vortexes which they generate.

BACKGROUND OF THE INVENTION

It is known that a blade for an aircraft rotating aerofoil usually includes an aerodynamically profiled main part, extending, along the blade chord, between a leading edge and a trailing edge, and, along the span of the blade, between a footing part equipped with a blade root for its connection to a rotor hub rotating around a rotor rotation axis, and a blade tip, at its free end.

During rotor rotation, vortexes are generated at the blade tip by the pressure difference between the intrados and the extrados at each blade tip. In certain flight configurations, particularly in the low speed approach phase, these vortexes can interact with the blades following the blade emission of vortexes, and the pressure gradients on the blades, created by the passage of a vortex in the plane of the blades, generate an impulsive noise which can be very intense.

This impulsive noise source results from the fact that the leading edge of a blade enters simultaneously into contact, along practically all its span, with the vortexes generated by at least one previous blade.

It is known that such interactions can be produced just as easily on a forward moving blade as a backward moving blade.

From the side of the forward moving blade, the vortexes are emitted in the second quadrant (blade azimuths between 90° and 180°, the azimuth 0° corresponding by convention to the position of the rear blade) and the interactions take place in the first quadrant (azimuths between 0° and 90°). The sound emission has a directivity in the direction of helicopter forward movement, under the main rotor.

From the side of the backward moving blade, the vortexes are emitted in the third quadrant (azimuths between 180° and 270°) and the interactions take place in the fourth quadrant (azimuths between 270° and 360°). The noise produced is directed toward the rear of the helicopter, under the main rotor.

The blade-vortex interaction noise is very disadvantageous, for it is maximum for angles of descent which correspond to those adopted by helicopters in the approach phase during landings.

The main problem at the basis of the invention is to decrease the blade-vortex interaction noise in particular in a range of descent angles which covers angles for which the blade-vortex interaction noise emitted is maximum (angle of descent of about 6°).

Different means have already been proposed in order to reduce the blade-vortex interaction noise, which depend on parameters of two main types, some linked to the vortex itself, and others to the geometry of the blade-vortex interaction. The different known means tend therefore either to modify the characteristics of the vortexes emitted, that is to say mainly their intensity and their viscous radius at the moment of interaction, or to modify the geometry of the interaction, mainly determined by the distance between the blade and vortex and the vertical and horizontal angles between the blade and the vortex line at the moment of interaction, these different parameters being determined mainly by the flight conditions, the power of the rotor and its rotational speed, the number of blades which it includes and their geometry (plane form, twisting, aerodynamic profile and blade tip).

Amongst the known means proposed for modifying the characteristics of the vortex at emission, distinction can be made between a first family of means aiming to decrease the eddying intensity of the vortex generated at the blade tip, and a second family of means aiming to create a second vortex, more internal than the blade tip vortex, in order to distribute the eddying intensity.

The known means of the first family are themselves sub-divided into passive and active means, the use of which modifies the aerodynamic circulation distribution on the blade span, because the intensity of the emitted vortex at the blade tip is directly connected to the span circulation gradient on the blade in this place, this gradient being all the higher as the maximum local load is situated near the blade tip.

A first known passive means consists in slimming down the tip or the blade end, so as to displace the maximum local circulation toward the inside of the rotor, and different blade end shapes slimmed down on the chord have been proposed.

A second known passive means consists in applying to the blade a twisting law leading to a weak blade tip circulation gradient, at the emission azimuths.

Other known passive means consist in adding a vertical aileron on the end profile of the blade tip in order to prevent or disrupt the rolling up of the vortex, or to add a spoiler on the leading edge at the blade end, in order to increase the viscous radius of the vortex.

The known active means are of ejecting an air flow at the blade tip and toward the trailing edge, in order to diffuse the vortex, or to reduce the vortex intensity with the help of control laws of appropriate pitch, such as multi-cyclic controls and individual blade controls, enabling controlling the pitch of the blades so that the lift of the blades at the emission azimuth of the interaction vortexes is as low as possible.

The second family of known means, aiming to distribute the vortex intensity, includes the addition of a small wing at the blade tip, so as to force the generation of two vortexes, one at the blade tip, and the other at the end of the small additional wing.

The known means for modifying the characteristics of the blade-vortex interaction geometry in order to decrease the noise are also subdivided into active and passive means.

The active means include multi-cyclic controls, already mentioned, controlling, for this application, the pitch of the blades in order that it is at a maximum on the side of the forward moving blade, between the interaction azimuths and the emission azimuths, in order to increase the load and the induced speed downward, and therefore to accelerate the convection of vortexes downward, so that the following blades do not enter, or enter the least possible, into collision with the emitted vortexes.

The passive means consist in modifying the geometry of the leading edge or of the line passing through the aerodynamic centres of the successive basic streamlined sections of the blade along the span, called quarter chord line (because the aerodynamic centres are each usually situated in the front quarter of the chord of the corresponding basic blade section). Indeed, the blade-vortex interaction noise is all the greater as the acoustic peaks emitted by the different blade sections reach an observation point in phase. Therefore, when the blade, at a given azimuth, is parallel to a vortex line, the different blade sections enter into collision with the vortex at the same instant. In order to break the parallelism between a blade and a vortex line, and thus put out of phase the acoustic sources, a blade has been proposed the external part of which is front cambered, whereas a more internal rear cambered part balances the blade.

The blade-vortex interaction noise can also be reduced by modification of the descent conditions and/or the helicopter approach trajectory, by increasing the angle of descent and/or the helicopter speed, so as to move away from the noisiest configuration.

This solution is however applicable with difficulty, because, for comfort and safety reasons, it is not conceivable to use angles of descent greater than 8°, whereas the optimum angle of descent of 6°, which corresponds to the certification angle of descent of helicopters, is that in the neighbourhood of which the maximum noise is emitted. [The acoustic nuisance of a rotor can also be reduced by reduction of the speed of rotation and/or the increase of the number of blades, but the gains obtained depend strongly on the actual flight conditions, during which fluctuations of descent slope, of wind and of speed impose relatively independent solutions for the aforementioned different parameters.

The problem at the basis of the invention is to decrease the sound emission on the one hand by an attenuation of the impulsive characteristics of the noise source which is more pronounced than with the means known to that end, and additionally independent of the angle of descent, by reducing the blade-vortex interaction noise by modification of the interaction geometry, and by breaking the parallelism, particularly horizontal, between the vortex line and the leading edge of the blade.

Another aim of the invention is to reduce the noise of a rotating blade by also modifying the end vortex which the blade generates and/or by modifying the blade-vortex distance, in particular by breaking the vertical parallelism between the vortex lines and the blade.

The invention has the further aim of obtaining a reduction of the blade-vortex interaction noise without penalty to the aerodynamic performances of the blade in the whole of the flight domain.

SUMMARY OF THE INVENTION

To this end, the invention proposes a blade for an aircraft rotating aerofoil, of the type explained above, which is characterised in that its aerodynamically profiled main part comprises an external end part, relative to the rotor axis, which is adjacent to the blade tip, this end part extending along the span over a distance of at least 0.2 R, where R is the rotor radius measured between the rotor axis of rotation and the blade tip, and this end part being cambered at the rear over a distance along the span of at least 0.15 R, the aerodynamically profiled main blade part also comprising a front cambered part which is immediately adjacent to the inside of the rear cambered end part, the aerodynamically profiled main part comprising, in addition, a progressively increasing chord portion, which is extended by a chord portion progressively decreasing along the span in the direction of the blade tip.

On such a blade, the presence of a rear camber in the blade external end part, which is a maximum sound contribution zone, has the effect of breaking the horizontal parallelism between the vortex line and the blade leading edge. The distinctive feature of the rear cambered end part of the blade of the invention is that it extends over at least 20% of the radius R, which contributes more than 80% of the radiated noise, while the rear cambered blade tips of known blades usually extend over 5 to 10% of the radius R and never extend beyond 18% of R. Another distinctive feature of the blade of the invention is its front cambered part, immediately adjacent to the inside of the rear cambered end part, and which not only ensures the balancing of the blade around the quarter chord line but also contributes to the reduction of the blade-vortex interaction noise, by de-phasing the pressure peaks emitted by the different blade sections. In this way the geometry of the blade-vortex interaction can be modified with the given form at the blade leading edge at least in its rear and front cambered adjacent parts.

Furthermore, in order to modify the blade-vortex distance and break the vertical parallelism between the blade and the interaction vortex lines, the blade of the invention has an original chord arrangement along the span, by the fact that its aerodynamically profiled main part includes a chord portion progressively increasing along the span, in the direction of the blade tip. This increasing chord portion can include at least a zone in which the leading edge is orientated, along the span in the direction of the blade tip, towards the front of the blade in the rotor plane, and/or at least a zone in which the trailing edge is orientated, still along the span in the direction of the blade tip, towards the rear of the blade in the rotor plane. This portion of blade increasing chord induces a variation of the vertical convection speed of the vortexes along the blade span, which has the effect of breaking the parallelism in the vertical plane.

Furthermore, the chord original arrangement along the span is such that the blade increasing chord portion is extended, along the span in the direction of the blade tip, by a chord portion progressively decreasing in the direction of the blade tip, which has the advantage of reducing the end circulation gradients, and therefore of reducing the intensity of the vortex emitted at the blade tip. In addition, this chord arrangement combines with the rear and front camber effect to reduce the impulsivity of the blade-vortex interaction noise.

In accordance with a preferred blade geometry, its front cambered part includes an internal portion and an external portion, adjacent to each other along the span in the direction of the blade tip, the internal portion being of progressively increasing chord along the span in the direction of the external portion, and the external portion being, on the one hand, adjacent to the rear cambered end part, and, on the other hand, with a chord progressively decreasing along the span in the direction of this rear cambered end part. In addition, this rear cambered end part has advantageously a chord progressively decreasing along the span up to the blade tip.

The blade can in addition include advantageously one or more of the following characteristics its rear cambered end part begins at a basic blade section
      the position of which along the span is between 0.5 R and 0.8 R, this rear cambered end part preferably extending between 0.8 R and R and the rear camber angle being between 10° and 40°, and preferably approximately 21°;

its front cambered part begins at a blade basic section the position of which, along the span, is between 0.35 and 0.65 R and extends up to a blade basic section the position of which along the span is between 0.5 R and 0.8 R, and the front camber angle is less than or equal to 20°, and preferably is of the order of 3.8°;

its aerodynamically profiled main part includes an internal portion with no camber, extending from the footing blade part to its front cambered part;

the blade maximum chord basic section is situated in a zone between about 0.45 R and 0.75 R, and the value of the maximum chord is between about 105% and about 150% of the chord at the footing, at 0.2 R of the blade;

its aerodynamically profiled main part has a chord progressively increasing along the span in the direction of the blade tip from about 0.2 R to about 0.67 R, where the chord has a maximum value of about 133% of the chord at the footing, the basic section of the blade having the maximum chord being situated nearer the footing than the maximum forward tilt basic section towards the front in the front cambered part, the chord being then reduced along the span up to the blade tip, where the chord is equal to approximately half of the chord at the footing;

the blade has a relative thickness which decreases along the span in the direction of the blade tip, at least in the rear cambered end part, and preferably which varies from about 12% in the footing part to about 7% at the blade tip;

the blade has a linear twist law, the blade twist varying by about −10° from the rotor centre to the blade tip;

the rear cambered end part has a shape in plan approximately rectangular or trapezoidal, or a rear camber parabolic evolution; and the blade tip, which projects outwards from the blade rear cambered end part, has zero camber or with a front camber or with a parabolic shape in plan.

A further object of the invention is an aircraft rotating aerofoil, comprising a rotor with at least two blades connected by their root to a hub intended to be rotated around the rotor rotational axis, this aerofoil is characterised in that each rotor blade is a blade such as defined above.

BRIEF DESCRIPTION OF THE DRAWINGS

Other advantages and characteristics of the invention will appear from the following description of embodiments, given as non limiting examples, by reference to the appended drawing on which:

the single FIGURE is a plan view of a preferred embodiment of the blade in accordance with the invention.

DETAILED DESCRIPTION OF THE PREFERRED EMBODIMENT

Figure 1:
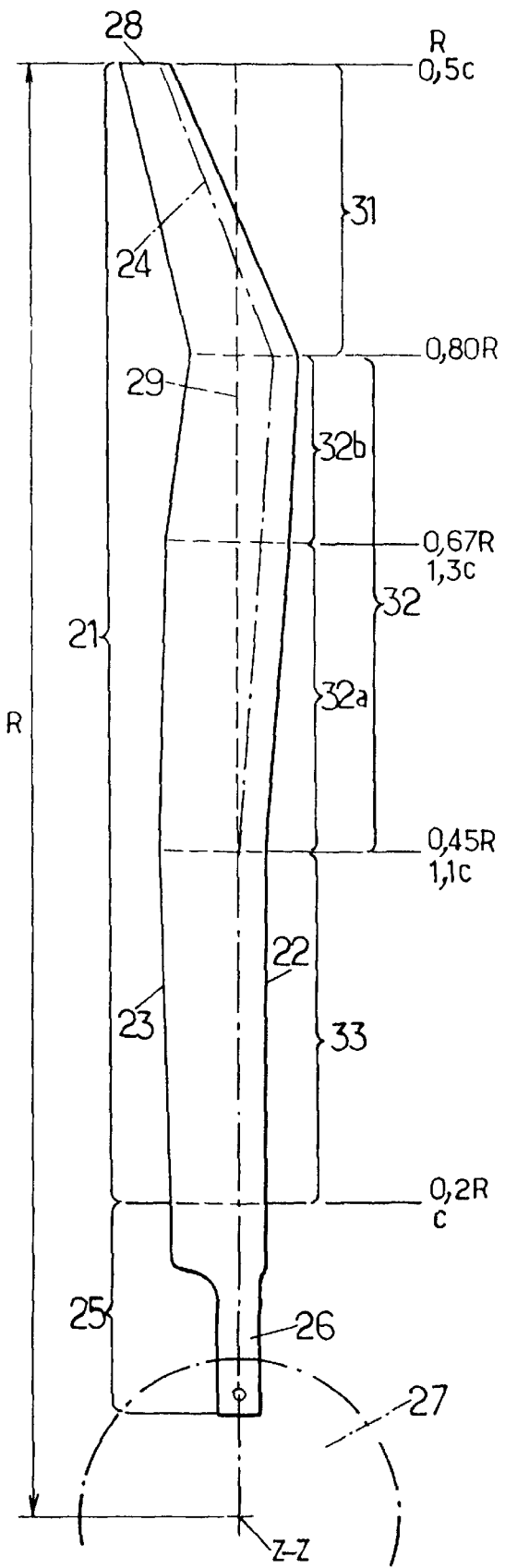

On the FIGURE, the helicopter main rotor blade includes an aerodynamically profiled main part 21 which extends between a footing part 25, which is provided with a blade root 26 by which the blade is connected, in a known way, to a rotor hub 27 intended to be rotated around the rotor axis Z—Z, and a blade tip 28 at the blade free end. The blade pitch can be controlled around a rectilinear pitch change axis 29 which is approximately radial relative to the rotor axis Z—Z. The blade aspect ratio, relative to the rotor radius on the chord at the footing, has a value between 13 and 17.

The aerodynamically profiled main part 21 includes an external end part 31, relative to the rotor axis Z—Z, which is immediately adjacent to the blade tip 28, this end part 31 being a rear cambered part over all its length and extending, along the span, over a distance greater than or equal to 0.2 R, where R is the rotor radius measured between the rotor rotational axis Z—Z and the blade tip 28. The aerodynamically profiled main part 21 also includes a front cambered part 32, which is immediately adjacent to the rear cambered part 31 and inside this latter, in order to ensure balancing of the blade.

Finally, between the front cambered part 32 and the footing part 25, the aerodynamically profiled main part 21 includes an internal portion 33 which has zero camber.

By front cambered or rear cambered part is understood, according to the invention, a part in which, along the span in the direction of the blade tip 28, the quarter chord line 24 is orientated respectively towards the front or towards the rear relative to the pitch axis 29, in the blade rotational plane.

As a result of the rear cambered 31 and front cambered 32 parts, it can be understood that the horizontal parallelism between a vortex line and the blade leading edge 22, in the rotor plane, is broken. Indeed, in the rear cambered 31 and front cambered 32 parts, certain blade sections interact with the vortex earlier and others later than the sections situated in the blade internal portion 33, with the result that the acoustic peaks are emitted at different sections at different emission instants and reach a same observation point after different path times, and therefore with a de-phasing as a result of which the impulsive noise level is much reduced. It is essential that the rear cambered part 31 extends over at least 20% of the radius R, that is to say over a zone which contributes more than 80% of the radiated noise.

In addition, the front cambered part 32, ensuring the balancing of the blade around the quarter chord line 24, also contributes to the reduction of the blade-vortex interaction noise for the reason explained above, that is to say by de-phasing also the pressure peaks emitted by the different blade sections in this part 32.

From a purely geometric point of view, it is known that a blade external front cambered part is more efficient than a rear cambered external part for reducing the blade-vortex interaction noise from the side of the forward moving blade, because in the first quadrant, an end part of a front cambered blade cannot be parallel to the vortex lines. In contrast, a rear cambered blade end part is likely to be parallel to the vortex lines for azimuths in the neighbourhood of 900°. However, a blade with a front cambered end part has less aero-elastic stability than the blade of the invention, and, furthermore, with a front cambered end part, the torsional stresses are very significant, particularly from the side of the forward moving blade. In addition, a blade external front cambered end part reinforces the parallelism between this blade end part and the vortex lines, from the side of the backward moving blade, in the fourth quadrant, which significantly increases the level of the blade-vortex interaction noise. In contrast, a blade in accordance with the invention, with an external rear cambered end part, increases the angle between the vortex lines and the leading edge 22, from the side of the backward moving blade, and enables the corresponding interaction noise to be reduced.

In the preferred blade example in the FIGURE, there is an aerodynamically profiled main part 21, extending between a blade tip 28 and a footing part 25 connected by its blade root 26 to the rotor hub 27 with axis Z—Z, and which includes a rear cambered external end part 31, a front cambered part 32 immediately adjacent to the rear cambered part 31 and inside this latter, and an internal portion 33 with zero camber, connecting the front cambered part 32 to the footing part 25.

[More precisely, the front cambered part 32 includes an internal portion 32a and an external portion 32b which are adjacent to each other, along the span and in the direction of the blade tip 28. The internal portion 32a has a chord progressively increasing along the span and in the direction of the external portion 32b, which is directly adjacent to the rear cambered end part 31 and with a chord progressively decreasing along the span and in the direction of this rear cambered part 31. This rear cambered part 31 itself has a chord progressively decreasing along the span up to the blade tip 28. Furthermore, the internal portion 33, although with zero camber, is also with a chord progressively increasing, from the footing part 25 up to the internal portion 32a of the front cambered part 32.

In this way, the aerodynamically profiled main blade part 21 includes, outside the footing part 25, a portion with a chord progressively increasing along the span, in the direction of the blade tip 28, and which corresponds to the portions 33 and 32a, and this progressively increasing chord portion is extended, along the span and in the direction of the blade tip 28, by a chord portion progressively decreasing, corresponding to the portion 32b and to the rear cambered part 31.

The increasing chord portion, defined by the portions 33 and 32a, is a zone in which the leading edge 22 is orientated, along the span and in the direction of the blade tip 28, towards the blade front in the rotor plane, whereas the trailing edge zone 23 situated in the zero camber portion 33 is orientated, along the span and towards the blade tip 28, towards the rear of the blade in the rotor plane. In the front cambered 32 and rear cambered 31 parts, the quarter chord line 24 is respectively orientated towards the front and towards the rear of the pitch axis 29, the leading 22 and trailing 23 edges being both front cambered in the portion 32b and rear cambered in the rear cambered part 31. Therefore, this rear cambered part 31 has an approximately trapezoidal shape in plan.

As a result of the front cambered 32 and rear cambered 31 parts, the blade in the FIGURE has the advantage of reducing the impulsivity of the blade-vortex interaction noise by rupture of the horizontal parallelism between the vortex lines and the blade leading edge 22. But in addition, as a result of its original chord arrangement along the span, the blade in the FIGURE enables the blade-vortex distance to be modified, not only moving away the blade vortex line, in a global manner, but also by breaking the vertical parallelism by modifying the blade-vortex distance in a vertical plane at different blade interaction sections, contrary to that which is observed with a classic rectangular blade, to which the interaction vortex lines are parallel not only in the rotor plane but also quasi-parallel in a vertical plane.

With the blade of the invention, the parallelism in the vertical plane is broken as a result of its chord variation law along the span, according to which the chord increases up to a blade section situated at about 0.7 R, where R is the rotor radius, then the chord is reduced up to the blade tip 28, in order to conserve the rotor thrust. This chord arrangement enables the lift and therefore the induced downward speeds to be increased, on the span portion near the chord maximum, and therefore enables the vortexes to be channelled downwards in this zone. The vortex lines emitted are in this way deformed by the passage of the following blades in the portion of the rotor disc between the emission azimuth and the interaction azimuth. This effect adds to the front camber effect of the part 32 and of the rear camber of the part 31 in order to reduce the impulsivity of the blade-vortex interaction noise. Another advantage of this chord arrangement is to reduce the circulation gradients at the level of the blade tip 28, by displacing the maximum lift towards the blade interior, which reduces the intensity of the vortex emitted at the blade tip 28.

In addition to this chord variation law, the blade has a profile thickness arrangement, which is determined so as to reduce the noise depth in descent flight but also in horizontal flight at low and high speeds. To this end, the depth variation law corresponds to a decrease of the relative thickness of the profiles of the blade sections from the blade root 26, where the relative thickness is about 12% of the considered chord section, up to the blade tip 28, where the relative thickness is about 7% of the considered chord section. The choice of profiles for which the thickness decreases with the span enables good aerodynamic and acoustic performances to be obtained.

These profiles enable a linear twist law for the blade to be adopted, with an aerodynamic twist which decreases by about -10° from the rotor centre, that is to say at the level of the Z—Z axis, up to the blade tip 28. In the conventional way, the twist is measured negatively when the leading edge 22 is lowered by covering the blade sections from the rotor centre Z—Z towards the blade tip 28, the final geometric setting being obtained by adding the zero lift incidence of the considered profile to the aerodynamic twist.

The quarter chord line 24 (corresponding to the place of the aerodynamic centres of the successive aerodynamically profiled blade sections) is linear by segments. The rear cambered part 31 begins at a blade section situated in the span between 0.5 R and 0.8 R, and has a rear camber angle of between 10 and 40°. In an optimised realisation, the rear cambered part 31 extends between 0.8 R and R, with a rear camber angle of 21°. The front cambered part 32 can begin at a basic blade section the position of which, along the span, is between 0.35 R and 0.65 R and extends up to a basic blade section the position of which along the span is between about 0.5 R and 0.8 R, with a front camber angle less than or equal to 20°. In the optimised realisation, the front cambered part 32 extends from 0.45 R to 0.8 R, with a front camber angle of 3.8°. This front camber angle has been determined in a way to minimise the torsional stresses on the blade and the pitch control forces. The portion 33 with zero camber extends preferably from the footing part 25 up to a blade section situated at 0.45 R in the span.

The maximum chord blade section is situated, in the span, between 0.45 R and 0.75 R, the value of the maximum chord being between 105% and 150% of the footing chord (at 0.2 R). In the optimised realisation, the chord c is constant in the footing up to the beginning of the portion 33, being 0.2 R in the span, and the chord then increases progressively up to the value 1.1c at the beginning of the portion 33a, at 0.45 R, and the chord reaches the value 1.3c at the section situated at 0.67 R, corresponding to the limit between the portions 32a and 32b. It is noted that the maximum chord section of 1.3c or 1.33c is situated nearer to the footing part 25 than the maximum forward tilt section towards the front of the quarter chord line 24, this section being at 0.8 R at the junction between the front cambered 32 and rear cambered 31 parts. In the rear cambered part 31, the chord is reduced up to the blade tip 28, where it is equal to 0.5c (half of the chord at the root).

As a variant, in the rear cambered part 31, the leading edge 22 can have a parabolic evolution, at least in its part nearest the blade tip 28. But it is also possible that the external end part 31 has a rear camber parabolic evolution.

On such a blade, the rear cambering of its external part 31, initially carried out for acoustic purposes, simultaneously brings an improvement in the high speed aerodynamic performances. For very high speeds, the external end part 31 can receive an optimised shape, for example a progressive parabolic camber and with a downwards dihedral. This type of end appears beneficial for the impulsive noise at high speed. Concerning the blade-vortex interaction noise, during flight descent, such a shape has the advantage of accentuating the break of the parallelism between the blade and the interacting vortex, and, further, enables a reduction of the vortex intensity.

Also as a variant, the geometry of the blade tip 28 can be different to that shown in FIG. 1. In particular, the blade tip can include a fin projecting outwards from the rear cambered end part 31, along the span, with a zero camber or a front camber, or can again be a blade tip having in plan a parabolic shape. But this blade tip never extends over more than 5% of R, so that the external end part 31, which extends over at least 20% of R, has a rear camber over at least 15% of R.

The blade is optimised in order to reduce the blade-vortex interaction noise for descent angles in the neighbourhood of 6°, and for flight speeds in the neighbourhood of 125 km/h. Relative to a reference blade, of rectangular shape in plan with a parabolic blade tip and downwards dihedral extending over 5 to 8% of the span, the blade obtains a gain of more than 6 dBA. Its sound level curve as a function of the descent angle does not have a high maximum for a specific angle of descent, unlike the corresponding curve of the reference blade, and between level flight and descent flight at 12°, the sound level of the blade of the invention does not vary by more than 6 dBA, and decreases rapidly for greater angles of descent, the sound level remaining slightly less than the reference rotor sound level, in the usable range of angles of descent. As a result of the blade of the invention, slope variations or changes in atmospheric conditions, inevitable in actual flight situations, do not generate therefore any strong increase in the sound level. Furthermore, at equal peripheral speed, the blade gives a gain greater than 5 dBA in horizontal flight at 210 km/h, and of 4 dBA at 250 km/h, these acoustic gains accompanying a reduction in consumed power in stable flight and in horizontal flight, whatever the forward speed. Indeed, the vibration levels of the blade of the invention remain less than those of the reference blade.

For these different reasons, it is therefore very advantageous to equip a helicopter main rotor with blades in accordance with the invention.

We claim:

1. A blade for an aircraft rotating aerofoil, comprising an aerodynamically profiled main part extending, more than fifty percent of the blade, between a leading edge and a trailing edge, and, along the blade span, between a footing part provided with a blade root for its connection to a rotor hub rotating about a rotor axis of rotation, and a blade tip, at its free end, wherein the aerodynamically profiled main part includes an external end part, relative to the rotor axis, and adjacent to the blade tip, the aforesaid end part extending along the span over a distance of at least 0.2 R, where R is the rotor radius measured between the rotor axis of rotation and the blade tip, and the aforesaid end part being rear cambered over a distance along the span of at least 0.15 R, the aforesaid aerodynamically profiled main part comprising also a front cambered part, which is immediately adjacent to the inside of the rear cambered end part, the aerodynamically profiled main part comprising in addition a progressively increasing chord portion which is extended by a progressively decreasing chord portion along the span in the direction of the blade tip.

2. A blade according to claim 1, wherein the aforesaid increasing chord portion includes at least a zone in which the leading edge is orientated, along the span in the direction of the blade tip, towards the front of the blade in the rotor plane.

3. A blade according to claim 1, wherein the aforesaid increasing chord portion includes at least a zone in which the trailing edge is orientated, along the span in the direction of the blade tip, towards the rear of the blade in the rotor plane.

4. A blade according to claim 1, wherein the aforesaid front cambered part includes an internal portion and an external portion, adjacent to each other along the span in the direction of the blade tip, the aforesaid internal portion being of a progressively increasing chord along the span in the direction of the aforesaid external portion, and the aforesaid external portion being, on the one hand, adjacent to the rear cambered end part, and, on the other hand, of a progressively decreasing chord along the span in the direction of the aforesaid rear cambered end part.

5. A blade according to claim 1, wherein the rear cambered end part begins at a blade basic section the position of which along the span is between 0.5 R and 0.8 R, the rear cambered part extending preferably between 0.8 R and R, and the rear camber angle being between 10° and 40°, and preferably approximately 21°.

6. A blade according to claim 1, wherein the front cambered part begins at a blade basic section the position of which along the span is between 0.35 R and 0.65 R and extends up to a blade basic section the position of which, along the span, is between 0.5 R and about 0.8 R, and the front camber angle is less than or equal to 20°, and preferably is of the order of 3.8°.

7. A blade according to claim 1, wherein it includes an internal portion of aerodynamically profiled main part with zero camber, extending from the footing blade part to its front cambered part.

8. A blade according to claim 1, wherein the blade maximum chord basic section is situated in a zone between about 0.45 R and 0.75 R, and the value of the maximum chord is between about 105% and about 150% of the chord at the footing blade.

9. A blade according to claim 8, wherein it has, in its aerodynamically profiled main part, extending more than fifty percent of the radius of the blade a chord increasing progressively along the span in the direction of the blade tip from about 0.2 R up to about 0.67 R, where the chord has a maximum value of about 133% of the chord at the footing, the blade basic section having the maximum chord being situated nearer the footing than the maximum forward tilt basic section towards the front in the front cambered part, the chord being then reduced along the span up to the blade tip, where the chord is equal to approximately half of the chord at the footing.

10. A blade according to claim 1, wherein it has a relative thickness which decreases along the span in the direction of the blade tip, at least in the rear cambered end part, and preferably which varies from about 12% in the footing part to about 7% at the blade tip.

11. A blade according to claim 1, wherein it has as linear twist law, the twist varying by about −10° from the rotor centre to the blade tip.

12. A blade according to claim 1, wherein the rear cambered end part has an approximately rectangular or trapezoidal shape in plan.

13. A blade according to claim 1, wherein the rear cambered end part has a rear camber parabolic evolution.

14. A blade according to claim 1, wherein by the fact that the blade tip, projecting outwards from the rear cambered end part, has a zero camber or a front camber or a parabolic shape in plan.

15. An aircraft rotating aerofoil, comprising a rotor with at least two blades connected by their root to a hub intended to be rotated around a rotor rotation axis, wherein each rotor blade includes an aerodynamically profiled main part extending more than 50% of the radius of the blade, between a leading edge and a trailing edge, and along the blade span, between a footing part provided with a blade root for its connection to a rotor hut rotating about a rotor axis of rotation, and a blade tip, at it free end, wherein the aerodynamically profiled main part includes an external end part, relative to the rotor axis, and adjacent to the blade tip, the aforesaid end part extending along the span over a distance of at least 0.2 R, where R is the rotor radius measured between the rotor axis of rotation and the blade tip, and the aforesaid end part being rear cambered over a distance along the span of at least 0.15 R, the aforesaid aerodynamically profiled main part comprising also a front cambered part, which is immediately adjacent to the inside of the rear cambered end part, the aerodynamically profiled main part comprising also a front cambered part, which is immediately adjacent to the inside of the rear cambered end part, the aerodynamically profiled main part comprising in addition a progressively increasing chord portion which is extended by a progressively decreasing chord portion along the span in the direction of the blade tip.

* * * * *

UNITED STATES PATENT AND TRADEMARK OFFICE
CERTIFICATE OF CORRECTION

PATENT NO.    : 6,116,857
DATED         : September 12, 2000
INVENTOR(S)   : Splettstoesser et al.

It is certified that error appears in the above-identified patent and that said Letters Patent is hereby corrected as shown below:

Title page,
Item [73] Assignee: add DEUTSCHES ZENTRUM FÜR LUFT-und RAUMFAHRT e. V.,Germany

Signed and Sealed this

Seventh Day of May, 2002

Attest:

JAMES E. ROGAN
Attesting Officer    Director of the United States Patent and Trademark Office

UNITED STATES PATENT AND TRADEMARK OFFICE
CERTIFICATE OF CORRECTION

PATENT NO.    : 6,116,857
DATED         : September 12, 2000
INVENTOR(S)   : Splettstoesser et al.

It is certified that error appears in the above-identified patent and that said Letters Patent is hereby corrected as shown below:

<u>Title page,</u>
Item [75], Inventors, please change "Berend Van De Wall" to
--Berend Van Der Wall --.

Signed and Sealed this

First Day of October, 2002

Attest:

JAMES E. ROGAN
Attesting Officer    Director of the United States Patent and Trademark Office